United States Patent [19]

Ebel et al.

[11] 4,003,851

[45] Jan. 18, 1977

[54] STABLE ALUMINA CATALYST SUPPORT, PROCESS THEREFOR, AND PROMOTED SUPPORT

[75] Inventors: Robert Henry Ebel, Riverside, Conn.; Louis Leonard Lento, Jr., Upper Saddle River, N.J.

[73] Assignee: American Cyanamid Company, Stamford, Conn.

[22] Filed: Mar. 12, 1975

[21] Appl. No.: 557,551

Related U.S. Application Data

[63] Continuation-in-part of Ser. No. 411,531, Oct. 31, 1973, abandoned.

[52] U.S. Cl. .............................. 252/465; 252/463; 252/466 PT; 423/213.2; 423/213.5
[51] Int. Cl.² .................... B01J 21/04; B01J 23/42; B01J 23/44; B01J 23/86
[58] Field of Search ............. 252/463, 465, 466 PT; 423/213, 2, 213.5, 628

[56] References Cited

UNITED STATES PATENTS

| 3,310,366 | 3/1967 | Koepernik | 423/212 C |
| 3,392,125 | 7/1968 | Kelly et al. | 423/213.2 |

*Primary Examiner*—W. J. Shine
*Attorney, Agent, or Firm*—William J. van Loo

[57] ABSTRACT

An alumina catalyst support substantially free of thermal skrinkage and having desirable physical properties is disclosed which is obtained by heating an alumina extrudate in a zone heated by direct fire to 1800°–2600° F. with combustion gases therein until less than 5% shrinkage when exposed to 1800° F. for 24 hours is obtained. Promoted supports as effective shrinkfree catalysts and the method therefor are also disclosed.

14 Claims, No Drawings

STABLE ALUMINA CATALYST SUPPORT, PROCESS THEREFOR, AND PROMOTED SUPPORT

This application is a continuation-in-part of application, Ser. No. 411,531, filed Oct. 31, 1973, and now abandoned.

This invention relates to an alumina catalyst support which is substantially free of volumetric shrinkage and possesses a favorable balance of physical properties which enables it to be effectively used in high temperature reactions. More particularly the present invention relates to an alumina support which without added stabilizer is substantially free of volumetric shrinkage when exposed to 1800° F. for 24 hours and provides an active catalyst material. The present invention also relates to the process for preparing the alumina support and to catalyst materials comprising the promoted support.

In considering a catalyst material for a particular reaction, it is first necessary to recognize the type of reaction involved. For known reactions, suitable catalyst materials are known and are readily available in most instances. Primary factors which govern the choice of useful catalysts in a known process are activity, selectivity, stability, and physical suitability. Other factors include regenerability and cost.

Most catalyst materials are complicated high-area solids whose precise chemical and physical structure determines their usefulness. Many catalysts comprise a major portion of high area solid, which is referred to as the support, and a minor portion of one or more additional components. The support material may or may not be catalytically active in the reaction. The additional components include promoter materials which provide catalytic activity to an inactive support or enhance the activity of an active support. Also included as additional components are support structure modifiers and stabilizers such as against shrinkage.

Alumina is a particularly desirable support material for numerous catalytic processes, in some of which alumina itself is catalytically active while in others it is inactive. For example, when alumina is dehydrated under severe conditions, i.e., at temperatures of 1100° F., it becomes increasingly active in catalyzing hydrogenation reactions. Under the same conditions of treatment, however, alumina shows little or no activity in catalyzing oxidation reactions.

Although activity in hydrogenation reactions can be provided by heating alumina under severe conditions, activity can be lost by overheating alumina, particularly in the presence of steam which causes sintering with loss of surface area. Overheating can also lead to changes in the physical phase in which alumina is present. Such phase change is also thought to have an adverse effect on catalyst performance.

Numerous methods have been proposed to stabilize alumina supports against geometric volume shrinkage and against phase change when used under high temperature conditions. Because of the expected dangers of overheating, these procedures for stabilizing alumina supports require use of an added material at some time in catalyst manufacture, the added material acting, in effect, as a stabilizer for the support. Although these procedures provide improved stability to alumina supports at limitedly high use temperatures, certain deficiencies arise from the use of stabilizers. Generally, the extent to which shrinkage is reduced is very limited and the temperature limit as to shrinkage reduction is too low for many purposes. The added stabilizers can have an adverse effect on catalyst performance, especially when appreciable quantities of stabilizer are required. In some instances, the stabilizers may adversely affect promoter materials by interfering with their action or the extent to which promoters can be present on the support. In instances where alumina is a catalytically active support, the presence of stabilizers, which are generally catalytically inactive, reduces the quantity of alumina in a given reactor space. Catalysts that are unstabilized, or of limited stability as a result of normal use of stabilizers, undergo considerable shrinkage of their geometric volume when exposed to severe reaction conditions. When such catalysts fill a reactor space as a bed, such shrinkage produces unoccupied channels in the bed through which reactants pass without contact with catalyst. Channeling of reactants decreases effectiveness of the catalyst bed regardless of the activity of the catalyst in the reactor space. Excessive heating, however, can cause loss of 50 percent or more of the original catalyst activity. Thus, whatever reactants comtact the catalyst are less effectively catalyzed.

There continues to exist the need for catalyst materials that will exhibit very limited shrinkage when exposed to high reaction temperatures and will undergo limited or no loss in activity upon exposure to conditions which normally cause shrinkage. If such a result could be achieved, it would constitute a significant advance in the catalyst art.

In accordance with the present invention, there is provided a stable catalyst support consisting essentially of precipitated alumina having a residual geometric volume shrinkage of less than about 5% upon exposure to a temperature of 1800° F. for 24 hours and a surface area in the range of about 75 to 120 square meters per gram.

In preferred embodiments, the support will also have a compacted bulk density in the range of about 25 to 50 pounds per cubic foot, a crush strength of at least about 7 pounds, and an attrition loss of less than about 7 weight percent.

In accordance with a more preferred embodiment of the present invention, there is provided a stable catalyst support consisting essentially of precipitated alumina having a residual geometric volume shrinkage of less than about 5% upon exposure to a temperature of 1800° F. for 24 hours, a compacted bulk density in the range of about 40 to 45 pounds per cubic foot, a surface area in the range of about 75 to 120 square meters per gram, a crush strength of at least about 10 pounds, and an attrition loss of less than about 5 weight percent.

In accordance with the present invention there is also provided an active catalyst material comprising the above-described support carrying thereon an effective amount of at least one promoter.

In accordance with the present invention, there is further provided a process for preparing a catalyst support as described above which comprises the steps of: (I) preparing a gel consisting essentially of precipitated alumina; (II) drying said gel; (III) molding said gel to provide a catalyst support; and (IV) heating said support to effect sufficient volume shrinkage to provide a residual volume shrinkage of less than about 5 percent upon exposure to a temperature of 1800° F. for 24 hours, said heating being carried out in a confined heating zone at substantially atmospheric pressure, said zone being heated by an ignited fuel providing combustion gases in said zone and having a high temperature area adjacent the ignited fuel in the range of about 1800° F. to 2600° F. and a low temperature area at a lower temperature above which the combustion gases exit said heating zone, the support being entered into said zone at the low temperature area, advanced to the high temperature area while being maintained in a rotating state, and exited at the high temperature area after the required residual shrinkage is obtained.

In a preferred embodiment, the low temperature area of the zone is at a temperature of at least about 800° F.

In accordance with a more preferred embodiment of the present invention, there is further provided a process for preparing a catalyst support as described above which comprises the steps of: (I) preparing a gel consisting essentially of precipitated alumina; (II) forming said gel to provide a catalyst support; and (III) heating said support to effect sufficient geometric volume shrinkage to provide a residual geometric volume shrinkage of less than about 5 percent upon exposure to a temperature of 1800° F. for 24 hours, said heating being carried out in a confined heating zone at substantially atmospheric pressure, said zone being heated by an ignited fuel providing combustion gases in said zone and having a high temperature area adjacent the ignited fuel at a temperature in the range of about 1800° F. to 2600° F. and a low temperature area at a temperature in the range of about 1350° F. to 2400° F., above which the combustion gases exit said heating zone, the support being entered into said zone at the low temperature area, advanced to the high temperature area while being maintained in a rotating state, and exited at the high temperature area after the required residual shrinkage is obtained.

In providing the catalyst materials according to the present invention, the following two steps are added to the process defined above with respect to preparing the support: (IV) applying to the shrunk support at least one promoter source, and thereafter (V) activating the support with its applied promoter source to provide a catalyst.

The present invention provides a substantially shrink-free alumina support with a favorable balance of physical properties which eminently qualify it when properly promoted for use in a variety of catalytic reactions in which high temperatures are or may be encountered.

The present invention provides an alumina support that undergoes very geometric volume shrinkage at temperatures up to 1800° F., retains its full catalytic activity under conditions which cause prior art catalyst to lose as much as 50 percent or more of their initial activity due to shrinkage, and contains no added stabilizer. These results are entirely unexpected in view of the prior art teachings. It is highly surprising that the specific method of heating employed should effectively shrink the support without causing sintering and provide a support useful in providing a highly active catalyst in view of the fact that other heating methods are ineffective.

The present invention provides a catalyst support which consists essentially of alumina free of any additive, said support undergoing geometric volume shrinkage after exposure at 1800° F. for 24 hours of less than 5 percent, preferably less than 2 percent and even less. The promoted catalyst support is highly effective as a catalyst material in reactions involving high temperatures and is substantially free of geometric volume shrinkage at high reaction temperatures, which shrinkage not only causes loss of catalyst activity but also results in production of unoccupied channels in the catalyst bed which enables reactants to bypass.

In preparing catalyst material according to the present invention, there is first prepared an alumina gel precipitate in accordance with conventional procedures, such as described in U.S. Pat. Nos. 3,032,514 and 3,096,854. The hydrogel initially prepared is washed to remove unwanted ions and then subjected to spray drying to form a powder. Since the base desired is one free of stabilizers and other unwanted additives, the alumina should be substantially pure, i.e., it should consist essentially of alumina. After the spray dried powder is obtained, it is processed by conventional procedures into a formed carrier. This may conveniently be done by means of a mix-muller and an extruder to provide extrudate of the desired size and shape. Typically, cylinders are formed of diameter from about 1/32 to ¼ inch and a length to diameter ratio of about 1:1 to 3:1. Additionally, the extrudates may have a specially shaped cross-section, such as polylobal shaped. Cross-sectional shapes that are designated figure-eight, clover leaf, dumbbell, and the like are among useful types and are contemplated. The formed carrier may also be prepared by pelletizing, tabletizing, molding, and the like.

The formed carrier is subjected to drying to remove free water and some bound water associated with forming operations. After drying, the carrier is subjected to the critical heating operation which reduces residual shrinkage when exposed to 1800° F. for 24 hours to below about 5 percent.

It will be apparent that the properties obtained in the heat-treated carrier will be influenced by the properties of the dried extrudates subjected to heat treatment. Thus, by a knowledge of the properties processed by the formed extrudates prior to extrusion, it is possible to determine whether or not processing further will provide the desired support. However, it is difficult to obtain reproducible property values upon testing extrudates that have only been dried prior to testing. Consequently, it is customary to calcine the dried extrudates for one hour at 1100° F. prior to testing to associate reproducible property values therewith. While the property values obtained do not actually represent those of the dried extrudates, they nevertheless provide values that are useful to establish further processing success. The following property values determined on dried extrudates after the one-hour calcination at 1100° F. are desirable:

| | |
|---|---|
| Compacted Bulk Density | = 30–38 lbs./ft.³ |
| Surface Area | = 150–300 meters²/gram |
| Pore Volume | = 0.7–1.0 cc/gram |

The critical heating operation is carried out in a confined zone using substantially atmospheric pressure. That is to say, although the heating zone is confined to concentrate the heat supplied, no effort is made to seal the zone and generate pressure thereby. Sufficient leakage occurs so that no significant pressure build-up over atmospheric pressure occurs.

The heating zone is supplied with heat from an ignited fuel providing combustion gases to the confined zone. The temperature of ignition is controlled by regulation of the fuel and oxygen supplies. Low sulfur fuels are preferred to minimize possible catalyst poisoning by sulfur compounds. The ignited fuel is such as to provide a temperature in the range of about 1800° to 2600° F. in a high temperature area adjacent the ignited fuel. Preferably, the high temperature area will be at about 1900°-2200° F. The combustion gases flow through the heating zone and exit therefrom at a low temperature area at lower temperature than the high temperature zone, preferably about 800° F. and more preferably in the range of about 1350° to 2400° F., the temperature of the exiting gases. Preferably, the low temperature area will be at about 1400°-1800° F. It can be appreciated that the length of the heating zone and time of travel therethrough in conjunction with the temperature of operation will determine the residual shrinkage value obtained. It is also clear that a temperature gradient will exist over the length of the heating zone and give rise to high and low temperature area, the former being adjacent the ignited fuel and the latter being at the end of the zone where the combustion gases exit.

It should be understood that the particular temperature at which the low temperature area operates will be influenced by the length of the heating zone, the longer is the zone the lower is the temperature. It is only necessary that the length of time during which the extrudates pass through the heating zone to the high temperature area is sufficient to provide the required residual shrinkage. Thus, for extremely long heating zones, the low temperature area may approach ambient temperatures while for shorter heating zones, the low temperature area may be at 800° F., 1350° F., or some higher temperature, but necessarily, a temperature below that of the high temperature area since the combustion gases cool as they travel away from the point of combustion.

The dry formed carrier enters the heating zone at the low temperature area under the flow of exiting exhaust gases. The carrier is carried slowly throughout the heating zone while being rotated and subjected to contact with the combustion gases which transfer heat to the carrier. The carrier flows toward the ignited gases so as to reach the higher temperature area. The carrier is maintained in the heating zone for a period sufficient to reduce its volume shrinkage to less than 5 percent when exposed at 1800° F. for 24 hours, preferably less than about 2 percent under the same conditions. The temperature of the exiting combustion gases will range from about ambient to about 1340° to 2400° F., preferably above about 800° F. and still more preferably 1400°-1800° F. Within the temperature range possible, the heating time may vary quite widely and the time necessary is that which provides the proper shrinkage values. Generally, a time in the range of about 15 to 90 minutes, preferably 30 to 60 will provide the shrinkage values when efficient heat transfer is achieved and reasonable amounts of carrier are passed through the heating zone over the time specified. The carrier exits from the higher temperature area of the heating zone and is cooled for subsequent handling.

The carrier obtained after the heat treatment is typified by the following physical properties, preferred values being when given the second value or range of values given:

| | |
|---|---|
| Compacted Bulk Density: | 25 to 50 pounds per cu. ft. |
| Surface area: | 75 to 125 sq. meters per gram |
| Crush Strength: | At least 7 pounds |
| Attrition Loss: | Less than 7 weight percent |
| Geometric Volume Shrinkage: | Less than 2 percent when exposed to 1800° F. for 24 hours |

A catalyst support having the above range of properties is eminently suitable for use in providing catalyst materials that are used in reactions that are conducted at high temperatures or are apt to reach high temperatures under severe operating conditions. Because of its substantial freedom from shrinkage the support does not give rise to any significant channelling in beds formed thereof, with the result that more effective conversion is provided than in cases where substantial shrinkage occurs. Since the support consists essentially of alumina, and no added stabilizer is necessary, there is no possibility of interference of stabilizer with activity of promoters subsequently applied.

In carrying out heating of catalyst supports by other procedures, such as in a Muffle Furnace, the use of a temperature as high as that employed in the present process does not effect the desired freedom from shrinkage and effects severe degration of support properties. The result is that the alumina so treated is useless as a catalyst support.

In carrying out heat treatment of alumina in accordance with the present invention, it is possible to vary the specific property values by varying the heat-treating conditions within the ranges specified. As extrudate density is increased with increased temperature within the specified range, surface area will decrease within the specified range and residual shrinkage will diminish. Crush strength and attrition loss will remain within the range specified. Thus, one should select the property values desired, keeping in mind inverse variabilities, and choose heat-treating conditions accordingly.

Although it is unexpected that the heat-treating conditions of the present invention should substantially eliminate geometric volume shrinkage of the alumina while maintaining desirable support properties in view of the ineffective of other procedures, an even greater degree of unexpectedness is associated with the values of the Crush Strength and Attrition Loss. While the greater losses in Surface Area associated with heat treatment in a Muffle Furnace would be expected to reflect high strength, the present invention provides considerably greater strength while providing desirable Surface Area for support use. Increases in strength are frequently associated with increases in Attrition Loss, but in the present invention, the losses due to support particle attrition are desirably low.

The catalyst support obtained as described above is generally not suitably active for use in catalytic processes. Desirably, therefore, the support is treated for use with a suitable promoter material and then activated according to conventional procedures. The nature of promoter material to be employed will be consistent with the nature of the catalytic reaction considered and the amount of promoter and activating procedure will also be consistent therewith. It can be readily appreciated that the support of the present invention will be advantageously used in conjunction with the reactions that normally give rise to high thermal shrinkage of conventional supports. However, numerous catalytic reactions are known which will be benefited by use of a substantially shrinkage-free support and, consequently the nature of the promoter material to be applied may vary widely without departing from the spirit of the present invention. Suitable promoters include, for example, platinum and combinations of platinum with other materials such as palladium, rhenium, gallium, germanium, rhodium, iridium, and the like, as well as auxilary promoter additives such as chloride ions, zinc and sulfur compounds. Combinations of molybdenum oxide with an oxide of cobalt or nickel or combinations thereof are also suitable. Additional suitable promoters include copper and chromium compounds. Various other promoter materials are well-known and conventionally employed in catalytic reactions and are not intended to be excluded by the above partial listing. However, complete listing of all known promoter materials would be unduly long and is not necessary to an understanding of the concept of a substantially shrinkage-free support carrying a conventional promoter material and being used under conditions which produce undesirable shrinkage or interference of an added stabilizer with promoter action.

An illustrative operation in which a catalyst material in the form of a bed reaches temperatures approaching 1800° F is that of treatment of exhaust gases emanating from internal combustion engines, as in the case of automobiles. The amount of pollutants reaching out atmosphere from automotive exhaust gases has become unsafe and state and federal laws have been enacted that require suitable emission controls. Because of the high temperatures a catalytic gas converter can reach and the adverse effects of such temperatures of the catalyst materials conventionally considered for use therein, the required emission controls are not maintained for any practical time period by conventional catalysts. The present invention, by providing the necessary support and, consequently, the necessary catalyst material enables the required emission controls to be achieved over time periods that are of desirably long duration.

To provide a catalyst material in accordance with the present invention, the support after subjection to the critical heating operation previously described is treated with a promoter source which upon subsequent calcination will yield the desired promoter material.

The particular promoter to be used is selected and suitable provisions are made to incorporate it on the carrier of the invention. Typically, this is carried out by impregnation, employing pore saturation techniques, but other conventional procedures may be used. Generally, a source of the promoter material is applied to the heat-treated carrier and thus-treated carrier is subjected to drying and calcination to convert the promoter source to the desired promoter material and activate the catalyst material. When more than a single promoter material is involved, application may involve multiple steps or a single step, with or without multiple promoter activations. After application of promoter source, however, at least one activation is required.

A separate step of drying the carrier after treatment with promoter is not required. Where removal of application medium is advantageous, it may be carried out in a conventional drying procedure or may be effected as a part of the activation procedure.

Activation is also carried out in accordance with conventional procedures. Generally, calcination is employed and is carried out at temperatures of 1100°–1500° F. for a suitable time period, generally in the range of from 30 minutes to several hours or more. Calcination time will generally be influenced by the temperature employed, the nature of the promoters involved, the nature of the carrier, effective heat transfer of the calciner, and other factors, as is well known. Accordingly, those procedures that are pertinent for like combinations in conventional activations are also pertinent in the present invention and no new techniques are involved.

This invention is more fully illustrated by the examples which follow wherein all parts and percentages are by weight, unless otherwise specified.

A typical preparation of a spray-dried alumina used in preparing extrudates is obtained as next described.

PREPARATION OF SPRAY-DRIED ALUMINA

A precipitated alumina hydrogel slurry is prepared as follows:

3480 parts of alumina sulfate solution containing 8% $Al_2O_3$ and 2310 parts of 26% $Al_2O_3$ solution of sodium aluminate are introduced simultaneously into a suitably agitated strike tank containing 12,500 parts of water to precipitate alumina hydrogel at pH7–7.5. The pH is then adjusted to 10.5 by the addition of excess sodium aluminate and the alumian hydrogel is filtered and washed at pH 10.5 to reduce the soda and sulfate content to below 0.5%.

The filter cake is repulped and filtered at pH 7–8 to reduce the soda content to below 0.02%.

The filter cake is then repulped to 17.2% solids. The resulting slurry is pumped into a spray dryer where it is dried at an inlet temperature of 800° F. and at a rate of 6 pounds of slurry per minute. The spray dried xerogel has a solids content of 67.1% based on the weight after calcination.

A typical procedure for preparing extrudates, used in the examples which follow using the xerogel prepared above is next given.

XEROGEL EXTRUSION

An extrusion mix is prepared by mixing 400 parts of the xerogel obtained above with 710 parts of water is intensively mixed using a mix-muller to provide an extrudable mixture of 33.5 percent xerogel. The mixture is extruded through a die plate containing orifices of a diameter of 1/18 inch. A screw-type extruder having an auger of 2.0 inch diameter is employed using an extrusion torque or 30 and an extrusion rate of 2 pounds per minute. The resulting extrudates are cut and dried at 250° F.

In the examples, reference is made to certain physical properties of the support. These properties are determined in the manner next described.

COMPACT BULK DENSITY

A given weight of extrudate is placed in a graduated cylinder sufficient to contain same within it graduated volume. The cylinder is then vibrated until all settling has ceased and a constant volume is obtained. The weight of sample occupying a unit volume is then reported.

SURFACE AREA

This value is determined by nitrogen adsorption. The volume of nitrogen due to extrudate adsorption is related to the surface area per unit weight of support. A detailed description of basic principles involved and the test procedure are given in Analytical Chemistry, Volume 30, page 1387 (1958).

CRUSH STRENGTH

Crush strength is determined by placing an extrudate on its side between two parallel plates. Force is applied on the top plate by means of pneumatic pressure until the extrudate is crushed. The device is such that the air pressure in pounds to cause crushing is the crush strength of the extrudate.

SHRINKAGE

A given amount of extrudates is placed in a graduated cylinder and vibrated until no further settling occurs, as is determining Compact Bulk Density. This sample is then placed in a Muffle Furnace at 1800° F. for 24 hours. At the end of this exposure, its volume is again measured after vibration until no further settling occurs. The loss in volume after heating is calculated, based on the original volume, and reported as shrinkage.

ATTRITION LOSS

A set volume of material to be tested is placed in an inverted Erlenmeyer flask of special construction that has a metal orifice inlet and a large (1 inch) outlet covered with 14-mesh screening. High velocity dry nitrogen gas is flowed through the inlet orifice causing the particles to: 1) circulate over one another thus causing attrition, and 2) impact themselves in the top section of the flask thus breaking down as a function of strength. The material is tested for five minutes and then weighed. The loss in weight after testing is designated the attrition loss.

The nitrogen flow will be in the range of about 3.5 and 4.0 cubic feet per minute, depending upon the density of the material. The flow rate must be sufficient for the particles to strike the top section of the flask. The fines produced by attrition are carried out of the flask by the nitrogen flow thus causing a loss in weight of the original material charged.

EXAMPLE 1

A portion of the extrudates prepared as described above, in three separate runs, were subjected to heat treatment using a combustible gas to heat a kiln in which it was directly fired. The kiln had a high temperature area at 1900° to 2000° F. and combustion gases exited from the lower temperature area at a temperature of 1400° to 1600° F. The extrudates were entered at the lower temperature area below the flow of exit gases and were advanced to the higher temperature area while being maintained in a state of rotation. In this manner, the individual extrudates had their entire surface equally exposed to the hot gases and flame. The rotating extrudates were advanced to the higher temperature area at a rate which was sufficient to reduce their geometric volume shrinkage below 5 percent and then exited from the kiln at the high temperature area. The residence time of extrudates in the kiln was approximately 1 hour. The heat-treated support properties are given in Table I.

TABLE I

|  | RUN 1 | RUN 2 | RUN 3 |
|---|---|---|---|
| C.B.D., lbs/ft³ | 43.4 | 42.1 | 43.0 |
| S.A., m.²/gm. | 101 | 100 | 95 |
| C.S., lbs. | 12.4 | 11.1 | 14.0 |

TABLE I-continued

|  | RUN 1 | RUN 2 | RUN 3 |
|---|---|---|---|
| Shrinkage[1], % | 0 | 0.8 | 0 |
| Attrition Loss, % | 4.0 | 4.1 | 4.0 |

[1]Geometric volume shrinkage after exposure at 1800° F. for 24 hours.

EXAMPLE 2

Following the procedure of Example 1, another portion of the extrudates was again heat treated, in this example in four runs. Crush strength values of the heat-treated supports are given in Table II. Compacted Bulk Density values for the four runs averaged 40 lbs./ft.³

COMPARATIVE EXAMPLE A

Another portion of the extrudates prepared above were calcined in a muffle furnace at 2050° F. for 1 hour in order to provide four runs of heat-treated extrudates having values of Compacted Bulk Density that averaged 40 lbs./ft.³. Crush strength values are given in Table II.

TABLE II

| | CRUSH STRENGTH | |
| RUN | MUFFLE FURNACE | DIRECT FIRED KILN |
|---|---|---|
| 1 | 6.1 lbs. | 12.8 lbs. |
| 2 | 6.0 lbs. | 13.1 lbs. |
| 3 | 8.8 lbs. | 10.2 lbs. |
| 4 | 6.3 lbs. | 13.7 lbs. |

EXAMPLE 3

A sample of heat-treated support was prepared following the procedure of Example 1. The heat treated support was impregnated with chloroplatinic acid and palladium nitrate in separate treatments followed by separate oven-dryings. The impregnated material was then activated to provide a catalyst material containing 0.05% platinum and 0.02% palladium, based on the total weight of activated support. Catalyst properties are given in Table III, representing evaluation as an oxidation catalyst for automotive exhaust gases.

COMPARATIVE EXAMPLE B

A portion of the extrudates prepared above were calcined in a Muffle Furnace at 1100° F. for one hour. The support thus heat-treated was impregnated with chlorplatinic acid and palladium nitrate and activated as in Example 3 to provide a catalyst material of the same platinum-palladium content as the catalyst of Example 3. Catalyst properties are given in Table III.

TABLE III

|  | EXAMPLE 3 | COMP. EXAMPLE B |
|---|---|---|
| Shrinkage[1] % | 2.0 | 11.0 |
| Conversion at 250° C. | | |
| AFTER 50 HOURS OF REACTION | | |
| Hydrocarbons | 83 | 4 |
| Carbon Monoxide | 95 | 19 |
| AFTER EXPOSURE AT 1800° F. FOR 24 HOURS | | |
| Hydrocarbons | 64 | 6 |
| Carbon Monoxide | 80 | 7 |

[1]See Table I

EXAMPLE 4

The procedure of Example 1 was again followed except that variations in heating temperatures and residence times were varied in a series of runs. The various temperatures and residence times for specific runs are given in Table IV below.

TABLE IV

| RUN NO. | KILN TEMPERATURE | GAS TEMPERATURE | RESIDENCE TIME |
|---|---|---|---|
| 1 | 2100 to 2200 | 1550 – 1700 | 45 min |
| 2 | 2300 to 2400 | 1650 – 1800 | 35 min. |
| 3 | 2350 to 2450 | 1700 – 1850 | 25 min. |
| 4 | 2400 to 2500 | 1750 – 1850 | 15. min |

In all runs, the heat-treated extrudates had physical properties within the following ranges:

Compacted Bulk Density: 43 to 46 lbs./ft.$^2$
Surface Area: 75 to 105 m$^2$./g.
Crush Strength: Greater than 10 lbs.
Attrition Loss: Less than 5%
Shrinkage [1]: Less than 3%

[1]See Table I

Generally, the higher temperature of heat treatment produced the higher densities, lower surface areas, and lower shrinkages within the range of values given. Crush Strength and Attrition Loss showed little variation over the temperature range and residence time variables studied.

EXAMPLE 5

The procedure of Example 3 was followed except that in place of chloroplatinic acid and palladium nitrate were used copper chloride and chromic acid. The impregnated material was then activated to provide a catalyst material containing 5.0% CuO and 3% Cr$_2$O$_3$, based on the total weight of the activated support. Evaluation as in Example 3 indicated that the catalyst obtained exhibited good activity as an oxidation catalyst even after exposure at 1800° F. for 24 hours.

EXAMPLE 6

The procedure of Example 3 was followed in every material detail except that the chloroplatinic acid was eliminated. Catalyst properties were similar to those obtained in Example 3.

EXAMPLE 7

The procedure of Example 3 was followed in every material detail except that the palladium nitrate was eliminated. Catalyst properties were similar to those obtained in Example 3.

An advantage in catalyst performance over long time periods appears to result from the combined use of platinum-palladium as in Example 3. Nevertheless, the separate use of platinum or palladium as in Examples 6 and 7 provides a highly desirable oxidation catalyst.

EXAMPLE 8

The procedure of Example 1 was repeated in every essential detail except that a longer kiln was employed and the lower temperature area at which the combustion gases exited was at a temperature of 800° F. The heat-treated supports obtained had properties substantially the same as the average of those obtained in the three runs of Example 1.

The embodiments of the invention in which an exclusive property or privilege is claimed are defined as follows:

1. A stable catalyst support consisting essentially of precipitated alumina having a residual geometric volume shrinkage of less than about 5% upon exposure to a temperature of 1800° F. for 24 hours and a surface area in the range of about 75 to 120 square meters per gram.

2. The support claim 1 also having a compacted bulk density in the range of about 25 to 50 pounds per cubic foot, a crush strength of at least 7 pounds, and an attrition loss of less than about 7 weight percent.

3. A stable catalyst support consisting essentially of precipitated alumina having a residual geometric volume shrinkage of less than about 5% upon exposure to a temperature of 1800° F. for 24 hours, a compacted bulk density in the range of about 40 to 46 pounds per cubic foot, a surface area in the range of about 75 to 120 square meters per gram, a crush strength of at least about 10 pounds, and an attrition loss of less than about 5 weight percent.

4. The support of claim 3 wherein the residual geometric volume shrinkage is less than about 2% after exposure to a temperature of 1800° F. for 24 hours.

5. A catalyst material comprising the support of claim 3 carrying thereon an effective amount of at least one promoter metal or metal compound.

6. The catalyst material of claim 5 wherein the promoter content comprises platinum and palladium and the catalyst material is an oxidation catalyst.

7. A process for preparing a catalyst support consisting essentially of precipitated alumina and having a residual geometric volume shrinkage of less than about 5% when exposed at 1800° F. for 24 hours and a favorable balance of physical properties which process comprises: (I) preparing a precipitated gel consisting essentially of alumina; (II) drying said gel; (III) molding said gel to provide a catalyst support; and (IV) heating said support to effect sufficient volume shrinkage to provide a residual volume shrinkage of less than about 5 percent upon exposure to a temperature of 1800° F. for 24 hours, said heating being carried out in a confined heating zone at substantially atmospheric pressure, said zone being heated by an ignited fuel providing combustion gases in said zone and having a high temperature zone adjacent the ignited fuel in the range of about 1800° F. to 2600° F. and a low temperature area at a lower temperature above which the combustion gases exit said heating zone, the support being entered into said zone at the low temperature area, advanced to the high temperature area while being maintained in a rotating state, and exited at the high temperature area after the required residual shrinkage is obtained.

8. The process of claim 7 wherein the low temperature area of the zone is at a temperature of at least about 800° F.

9. A process for preparing a catalyst support having a residual geometric volume shrinkage of less than about 5% when exposed at 1800° F. for 24 hours which process comprises: (I) preparing a gel consisting essentially of alumina; (II) forming said gel to provide a catalyst support; and (III) heating said support to effect sufficient geometric volume shrinkage to provide a residual geometric volume shrinkage of less than about 5% upon exposure to 1800° F. for 24 hours, said heating being carried out in a confined heating zone at substantially atmospheric pressure, said zone being heated by an ignited fuel providing combustion gases in said zone and having a high temperature area adjacent the ignited fuel in the range of about 1800° F. to 2400° F. and a low temperature area in the range of about 1350° F. to 2400° F., above which the combustion gases exit said heating zone, the support being entered into said zone at the low temperature area, advanced to the high temperature area while being maintained in a rotating state, and exited at the high temperature area after the required residual shrinkage is obtained.

10. The process of claim 9 wherein the ignited fuel provides a temperature in the range of 1900° F. to 2200° F.

11. The process of claim 9 wherein the combustion gases exit at 1400° F. to 1800° F.

12. The process of claim 9 wherein the following steps are added in the sequence indicated: (IV) applying to the shrunk support an effective content of at least one promoter metal acid or metal salt, and thereafter activating the support with its applied promoter metal acid or metal salt to provide a catalyst.

13. The process of claim 12 wherein as promoter metal acid or metal salt are applied chloroplatinic acid and palladium nitrate.

14. The process of claim 12 wherein as promoter metal acid or metal salt are employed copper chloride and chromic acid.

* * * * *